US006837959B2

(12) United States Patent
Daems et al.

(10) Patent No.: US 6,837,959 B2
(45) Date of Patent: Jan. 4, 2005

(54) CARRIER OF INFORMATION, AND ID CARD

(75) Inventors: Eddie Daems, Herentals (BE); Bart Aerts, Rumst (BE); Luc Leenders, Herentals (BE)

(73) Assignee: Agfa-Gevaert, Mortsel (BE)

( * ) Notice: Subject to any disclaimer, the term of this patent is extended or adjusted under 35 U.S.C. 154(b) by 121 days.

(21) Appl. No.: 10/403,257

(22) Filed: Mar. 31, 2003

(65) Prior Publication Data

US 2003/0213550 A1 Nov. 20, 2003

Related U.S. Application Data

(60) Provisional application No. 60/389,122, filed on May 20, 2002.

(30) Foreign Application Priority Data

May 16, 2002 (EP) ............................................ 02100499

(51) Int. Cl.[7] ................................................ B32B 31/00

(52) U.S. Cl. .................... 156/269; 156/275.5; 156/277; 156/278

(58) Field of Search ................................ 156/250, 269, 156/272.2, 275.5, 277, 278, 379.6, 384, 387, 510

(56) References Cited

U.S. PATENT DOCUMENTS

| | | | | | |
|---|---|---|---|---|---|
| 3,506,467 A | * | 4/1970 | Ulrich | ........................ | 428/205 |
| 5,019,202 A | * | 5/1991 | Kawahata et al. | .......... | 156/277 |
| 5,800,658 A | * | 9/1998 | Gustafsson et al. | ......... | 156/245 |
| 6,299,944 B1 | * | 10/2001 | Trapani | ...................... | 427/493 |

OTHER PUBLICATIONS

European Search Report, Application No. 02 10 0499, Oct. 17, 2002.

* cited by examiner

*Primary Examiner*—James Sells
(74) *Attorney, Agent, or Firm*—Joseph T. Guy; Nexsen Pruet, LLC

(57) ABSTRACT

A method for the manufacturing of a tamper proof carrier of information is disclosed comprising a support and an opaque porous ink receiving layer. The carrier comprises at least two sets of information, preferably a first set representing general information or security print, and a second set representing personalized information. The ink receiving layer is rendered transparent by impregnation with a UV curable lacquer whereby the underlying information is revealed. Upon UV curing its mechanical properties are improved. The finished information carrier is preferably cut in a set of multiple identification cards.

18 Claims, No Drawings

CARRIER OF INFORMATION, AND ID CARD

The application claims the benefit of Provisional Application No. 60/389,122, filed May 20, 2002.

FIELD OF THE INVENTION

The present invention relates to a method for the preparation of an improved carrier of information.

BACKGROUND OF THE INVENTION

In recent years, with the progress of information-oriented society several types of identification (ID card) cards have come into use. For instance, cards involved in the electronic transfer of money include bank cards, pay cards, credit cards and shopping cards. Different types of security cards authorize access to the bearer of the card to particular areas such as a company (employee ID card), the military, a public service, the safe department of a bank, etc. For long time national states have issued identity cards to establish the national identity of their civilians. Still other types of identification cards include social security cards, membership cards of clubs and societies, and driver's licence cards.

Such ID cards usually contain information referring both to the authority issuing the card on the one hand and to the owner of the card. The first type of information may be general information such as a name and/or logo of the issuing authority, or security marks, such as a watermark and security print, e.g a repeating monochrome pattern or a gradually changing colour pattern which are difficult to counterfeit. The second type includes e.g. the unique card number, personal data such as a birth day, a photo of the owner, and a signature. The card can further contain hidden information and therefore contain a magnetic strip or an electronic chip ("smart cards").

A large set of ID cards are usually prepared on a large carrier of information such as a web or sheet by a step and repeat process, after which the information carrier is cut into multiple items with the appropriate dimensions each representing a personal ID card. Smart cards and ID cards have now the standardized dimensions of 85.6 mm×54.0 mm×0.76 mm.

Normally, the card is protected by a plastic sheet material such as by lamination of the card to a plastic sheet or, as it is usually the case by lamination between two plastic sheets.

In view of their widespread uses, especially in commercial transactions, such as cashing checks, credit purchases, etc., it is important that the person relying on the ID card to identify the bearer have maximum assurance that the ID card has not been altered and/or that the ID card is not a counterfeit. A great deal of ingenuity has been employed to provide this desired degree of assurance. For example, specialized adhesive systems and lamination techniques have been developed to prevent or discourage alteration of ID cards. These systems and techniques are designed to achieve a high degree of bonding efficiency between a surface of the card and any plastic sheet material bonded to it. Certain adhesive systems, for example, can provide what is known in the art as a "security seal". A "security seal" is best explained by describing what happens if an attempt is made to pull a plastic sheet material from the surface of a card bonded to the plastic. If a "security seal" exists, all or at least portions of the adhered surface will be removed from the card together with the plastic sheet material. Accordingly, a "security seal" is normally established between the information-bearing surface of the card or document and the plastic. Under such circumstances, removal of the plastic should also remove substantial portions of the information-bearing surface of the card to render the card unusable for alteration purposes. Adhesives or adhesive systems which can provide "security seals" are described in e.g. U.S. Pat. Nos. 3,582,439, 3,614,839 and 4,115,618. According to U.S. Pat. No. 4,322,461 a security seal can be provided by applying heat-sealable polymers so as to obtain a sealed envelop-type pouch.

Furtheron, the art's response to the counterfeiting problem has involved the integration of "verification features" with ID cards to evidence their authenticity. The best known of these "verification features" involve signatures such as the signature of the one authorized to issue the ID card or the signature of the bearer. Other "verification features" have involved the use of watermarks, fluorescent materials, validation patterns or markings and polarizing stripes among others. These "verification features" are integrated with ID cards in various ways and they may be visible or invisible in the finished card. If invisible, they can be detected by viewing the feature under conditions which render it visible. Details relating to the use of "verification features" in ID cards can be found in such patents as U.S. Pat. Nos. 2,984,030; 3,279,826; 3,332,775; 3,414,998; 3,675,948; 3,827,726 and 3,961,956.

In U.S. Pat. No. 4,232,079 a protective laminar assembly for lamination to an information-bearing document is disclosed comprising a verification pattern of a light-transmissive pigment.

In U.S. Pat. No. 4,389,472 a tamper proof document is disclosed consisting of an information carrier comprised of a sheet having photographic information and laminated with at least one foil, which carries an adhesive layer containing a polymer hardened by radical crosslinking by high energy radiation or by initiators capable of being activated by UV light or by heat.

In U.S. Pat. No. 5,525,400 a multilayer laminated structure is disclosed wherein an adhesive layer is coated on both sides of a foil which bears on one side a reflecting microporous layer which is rendered light-permeable by the action of the adhesive. The foil bears on the side of the microporous layer an image applied by ink jet printing. The sandwich is cured by UV radiation. This represents a rather complicated assemblage and there is no mentioning of the presence of different types of information.

SUMMARY OF THE INVENTION

It is an object of the present invention to provide a method for the fabrication of an improved type of information carrier which can be easily manufactured, has an uncomplicated layer structure, and can be cut in a set of ID cards.

It is a further object of the invention that the information carrier thus obtained is able to contain at least two different types of information.

It is a further object of the invention that the ID cards which can be cut from the information carrier are tamper proof.

The desired features described are obtained by providing a method for producing a tamper proof carrier of information, said method comprising the following steps, in order, (1) providing a two-layer assemblage comprising (i) a rigid sheet or web support, and (ii) a porous opaque ink receiving layer comprising a pigment and a binder whereby either the surface of said support, or the surface of said opaque layer carries a first set of printed information, (2) printing a second set of information, different from said first set, onto said porous opaque ink receiving layer by means of ink jet printing, (3) covering totally, partially, or pattern-wise the thus obtained assemblage with a UV-curable laquer composition, by means of coating, printing, spraying or jetting, whereby on penetration of the lacquer in said porous opaque ink receiving layer this layer becomes substantially transparent, (4) curing said laquer composition by means of an overall UV exposure, thereby improving the adhesion between said support and said ink receiving layer, and the cohesive strength of said ink receiving layer.

In an alternative embodiment the UV curable composition is applied pattern-wise whereby the obtained pattern serves as a watermark, so that the presence of the first set of information (described in step 1) becomes optional.

In a preferred embodiment the final assemblage further comprises a protective transparent top foil applied by lamination before the UV curing step.

DETAILED DESCRIPTION OF THE INVENTION

We will describe now in more detail the particular layer arrangement and the ingredients of the information carrier in accordance with the present invention.

The Sheet or Web Support

The support for use in the present invention can be chosen from paper type and polymeric type supports well-known from photographic technology. Paper types include plain paper, cast coated paper, polyethylene coated paper and polypropylene coated paper. Polymeric supports include cellulose acetate propionate or cellulose acetate butyrate, polyesters such as polyethylene terephthalate and polyethylene naphthalate, polyamides, polycarbonates, polyimides, polyolefins, poly(vinylacetals), polyethers and polysulfonamides. Other examples of useful high-quality polymeric supports for the present invention include opaque white polyesters and extrusion blends of polyethylene terephthalate and polypropylene. Polyester film supports and especially polyethylene terephthalate are preferred because of their excellent properties of dimensional stability. When such a polyester is used as the support material, a subbing layer may be employed to improve the bonding of the ink-receiving layer to the support. Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

In a most preferred embodiment of the present invention the support is colored or whitened polyvinyl chloride or polyethylene terephthalate.

The Ink Receiving Layer

Essential to the present invention is that the ink receiving layer is porous and opaque and contains a binder and a pigment.

The binder can be chosen from a list of compounds well-known in the art including hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; polyvinyl alcohol; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinylmethyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; polyethylene oxide; polyurethane; melamine resins; gelatin; carrageenan; dextran; gum arabic; casein; pectin; albumin; starch; collagen derivatives; collodion and agar-agar.

A preferred binder for the practice of the present invention is a polyvinylalcohol (PVA), a vinylalcohol copolymer or modified polyvinyl alcohol. Most preferably, the polyvinyl alcohol is a silanol modified polyvinyl alcohol. Most useful commercially available silanol modified polyvinyl alcohols can be found in the POVAL R polymer series, trade name of Kuraray Co., Japan. This R polymer series includes the grades R-1130, R-2105, R-2130, R-3109, which differ mainly in the viscosity of their respective aqueous solutions. The silanol groups are reactive to inorganic substances such as silica or alumina. R-polymers can be easily crosslinked by changing the pH of their aqueous solutions or by mixing with organic substances and can form water resistant films.

The pigment may be chosen from the inorganic pigments well-known in the art such as silica, talc, clay, hydrotalcite, kaolin, diatomaceous earth, calcium carbonate, magnesium carbonate, basic magnesium carbonate, aluminosilicate, aluminum trihydroxide, aluminum oxide (alumina), titanium oxide, zinc oxide, barium sulfate, calcium sulfate, zinc sulfide, satin white, boehmite (alumina hydrate), zirconium oxide or mixed oxides.

In a preferred embodiment the main pigment is chosen from silica, aluminosilicate, alumina, calcium carbonate, alumina hydrate, and aluminum trihydroxide.

The use of aluminum oxide (alumina) in ink receiving layers is disclosed in several patents, e.g. in U.S. Pat. No. 5,041,328, U.S. Pat. No. 5,182,175, U.S. Pat. No. 5,266,383, EP 218956, EP 835762 and EP 972650.

Commercially available types of aluminum oxide (alumina) include $\alpha$-$Al_2O_3$ types, such as NORTON E700, available from Saint-Gobain Ceramics & Plastics, Inc, $\gamma$-$Al_2O_3$ types, such as ALUMINUM OXID C from Degussa, Other Aluminum oxide grades, such as BAIKALOX CR15 and CR30 from Baikowski Chemie; DURALOX grades and MEDIALOX grades from Baikowski Chemie, BAIKALOX CR80, CR140, CR125, B105CR from Baikowski Chemie; CAB-O-SPERSE PG003 tradeamrk from Cabot, CATALOX GRADES and CATAPAL GRADES from from Sasol, such as PLURALOX HP14/150; colloidal $Al_2O_3$ types, such as ALUMINASOL 100; ALUMINASOL 200, ALUMINASOL 220, ALUMINASOL 300, and ALUMINASOL 520 trademarks from Nissan Chemical Industries or NALCO 8676 trademark from ONDEO Nalco.

A useful type of alumina hydrate is $\gamma$-AlO(OH), also called boehmite, such as, in powder form, DISPERAL, DISPERAL HP14 and DISPERAL 40 from Sasol, MARTOXIN VPP2000-2 and GL-3 from Martinswerk GmbH.; Liquid boehmite alumina systems, e.g. DISPAL 23N4-20, DISPAL 14N-25, DISPERAL AL25 from Sasol. Patents on alumina hydrate include EP 500021, EP 634286, U.S. Pat. No. 5,624,428, EP 742108, U.S. Pat. No. 6,238,047, EP 622244, EP 810101, etc.

Useful aluminum trihydroxides include Bayerite, or $\alpha$-Al$(OH)_3$, such as PLURAL BT, available from Sasol, and Gibbsite, or γ-$Al(OH)_3$, such as MARTINAL grades from Martinswerk GmbH, MARTIFIN grades, such as MARTIFIN OL104, MARTIFIN OL 107 and MARTIFIN OL111 from Martinswerk GmbH, MICRAL grades, such as MICRAL 1440, MICRAL 1500; MICRAL 632; MICRAL 855; MICRAL 916; MICRAL 932; MICRAL 932CM; MICRAL 9400 from JM Huber company; HIGILITE grades, e.g. HIGILITE H42 or HIGILITE H43M from Showa Denka K.K., HYDRAL GRADES such as HYDRAL COAT 2, HYDRAL COAT 5 and HYDRAL COAT 7, HYDRAL 710 and HYDRAL PGA, from Alcoa Industrial Chemicals.

A useful type of zirconium oxide is NALCO OOSS008 trademark of ONDEO Nalco, acetate stabilized ZrO2, ZR20/20, ZR50/20, ZR100/20 and ZRYS4 trademarks from Nyacol Nano Technologies.

Useful mixed oxides are SIRAL grades from Sasol, colloidal metaloxides from Nalco such as Nalco 1056, Nalco TX10496, Nalco TX11678.

Silica as pigment in ink receiving elements is disclosed in numerous old and recent patents, e.g. U.S. Pat. No. 4,892,591, U.S. Pat. No. 4,902,568, EP 373573, EP 423829, EP 487350, EP 493100, EP 514633, etc. Different types of silica may be used, such as crystalline silica, amorphous silica, precipitated silica, gel silica, fumed silica, spherical and non-spherical silica, calcium carbonate compounded silica such as disclosed in U.S. Pat. No. 5,281,467, and silica with internal porosity such as disclosed in WO 00/02734.

The use of calcium carbonate in ink receiving layers is described in e.g. DE 2925769 and U.S. Pat. No. 5,185,213. The use of aluminosilicate is disclosed in e.g. DE 2925769.

Mixtures of different pigments may be used.

In an alternative embodiment the main pigment can be chosen from organic particles such as polystyrene, polymethyl methacrylate, silicones, melamine-formaldehyde condensation polymers, urea-formaldehyde condensation polymers, polyesters and polyamides. Mixtures of inorganic and organic pigments can be used. However, most preferably the pigment is an inorganic pigment.

The pigment must be present in a sufficient coverage in order to render the ink receiving layer sufficiently opaque and porous. The lower limit of the ratio by weight of the binder to the total pigment in the first ink receiving layer is preferably about 1:50, most preferably 1:20, while the upper limit thereof is about 2:1, most preferably 1:1. If the amount of the pigment exceeds the upper limit, the strength of the ink receiving layer itself is lowered, and the resulting image hence tends to deteriorate in rub-off resistance and the like. On the other hand, if the binder to pigment ratio is too great, the ink-absorbing capacity of the resulting ink-receiving layer is reduced, and so the image formed may possibly be deteriorated.

Further, preferably, the refraction indices of the pigment on the one hand, and of the UV-curable composition (see description lateron) on the other hand should match each other as closely as possible. The closer the match of the refraction indices the better the transparency which will be obtained after impregnation of the receiver layer with the photopolymerizable lacquer composition.

The most preferred pigment is a silica type, more particularly an amorphous silica having a average particle size ranging from 1 μm to 15 μm, most preferably from 2 to 10 μm. A most useful commercial compound is the amorphous precipitated silica type SIPERNAT 570, trade name from Degussa Co. It is preferably present in the receiving layer in an amount ranging from 5 $g/m^2$ to 30 $g/m^2$. It has following properties:

specific surface area ($N_2$ absorption): 750 $m^2/g$ mean particle size (Multisizer, 100 μm capillarity): 6.7 μm DBP adsorption: 175–320 g/100 g refraction index: 1.45 à 1.47.

Since the refraction index of a typical UV-curable lacquer composition is about 1.47 à 1.49 it is clear that there is good match with the refraction index of this particular silica type, and good transparency will be obtained.

Other usable precipitated silica types include SIPERNAT 310, 350 and 500, AEROSIL grades (trade mark of Degussa-Hüls AG), and SYLOID types (trade mark from Grace Co.).

A receiver layer containing a porous alumina pigment such as MARTINOX GL-1 does not become completely transparent on impregnation with a UV-curable lacquer since its refraction index is 1.6. On the other hand a layer with this pigment undergoes a strong improvement in adhesion between support and ink jet receiver layer on impregnation with a UV-curable lacquer.

Apart from the essential ingredients described above a cationic substance acting as mordant may be present in the ink receiving layer. Such substances increase the capacity of the layer for fixing and holding the dye of the ink droplets. A particularly suited compound is a poly (diallyldimethylammonium chloride) or, in short, a poly (DADMAC). These compounds are commercially available from several companies, e.g. Aldrich, Nalco, CIBA, Nitto Boseki Co., Clariant, BASF and EKA Chemicals.

Other useful cationic compounds include DADMAC copolymers such as copolymers with acrylamide, e.g NALCO 1470 trade mark of ONDEO Nalco or PAS-J-81, trademark of Nitto Boseki Co., such as copolymers of DADMAC with acrylates, such as Nalco 8190, trademark of ONDEO Nalco; copolymers of DADMAC with $SO_2$, such as PAS-A-1 or PAS-92, trademarks of Nitto Boseki Co., copolymer of DADMAC with maleic acid, e.g. PAS-410, trademark of Nitto Boseki Co., copolymer of DADMAC with diallyl(3-chloro-2-hydroxypropyl)amine hydrochloride, eg. PAS-880, trademark of Nitto Boseki Co., dimethylamine-epichlorohydrine copolymers, e.g. Nalco 7135, trademark of ONDEO Nalco or POLYFIX 700, trade name of Showa High Polymer Co.; other POLYFIX grades which could be used are POLYFIX 601, POLYFIX 301, POLYFIX 301A, POLYFIX 250WS, and POLYFIX 3000; NEOFIX E-117, trade name of Nicca Chemical Co., a polyoxyalkylene polyamine dicyanodiamine, and REDIFLOC 4150, trade name of EKA Chemicals, a polyamine; MADAME (methacrylatedimethylaminoethyl=dimethylaminoethyl methacrylate) or MADQUAT (methacryloxyethyltrimethylammonium chloride) modified polymers, e.g. ROHAGIT KL280, ROHAGIT 210, ROHAGIT SL144, PLEX 4739L, PLEX 3073 from Röhm, DIAFLOC KP155 and other DIAFLOC products from Diafloc Co., and BMB 1305 and other BMB products from EKA chemicals; cationic epichlorohydrin adducts such as POLYCUP 171 and POLYCUP 172, trade names from Hercules Co.; from Cytec industries: CYPRO products, e.g. CYPRO 514/515/516, SUPERFLOC 507/521/567; cationic acrylic polymers, such as ALCOSTAT 567, trademark of CIBA, cationic cellulose derivatives such as CELQUAT L-200, H-100, SC-240C, SC230M, trade names of Starch & Chemical Co., and QUATRISOFT LM200, UCARE polymers JR125, JR400, LR400, JR30M, LR30M and UCARE polymer LK; fixing agents from Chukyo Europe: PALSET JK-512, PALSET JK512L, PALSET JK-182, PALSET JK-220, WSC-173, WSC-173L, PALSET JK-320, PALSET JK-320L and PALSET JK-350; polyethyleneimine and copolymers, e.g. LUPASOL, trade name of BASF AG; triethanolamine-titanium-chelate, e.g. TYZOR, trade name of Du Pont Co.; copolymers of vinylpyrrolidone such as VIVIPRINT 111, trade name of ISP, a methacrylamido propyl dimethylamine copolymer; with dimethylaminoethylmethacrylate such as COPOLYMER 845 and COPOLYMER 937, trade names of ISP; with vinylimidazole, e.g. LUVIQUAT CARE, LUVITEC 73W, LUVITEC VPI55 K18P, LUVITEC VP155 K72W, LUVIQUAT FC905, LUVIQUAT FC550, LUVIQUAT HM522, and SOKALAN HP56, all trade names of BASF AG; polyamidoamines, e.g. RETAMINOL and NADAVIN, trade marks of Bayer AG; phosphonium compounds such as disclosed in EP 609930 and other cationic polymers such as NEOFIX RD-5, trademark of Nicca Chemical Co.

The ink receiving layer may further contain well-known conventional ingredients, such as surfactants serving as coating aids, hardening agents, plasticizers, whitening agents and matting agents.

Surfactants may be any of the cationic, anionic, amphoteric, and non-ionic ones as described in JP-A 62-280068 (1987). Examples of the surfactants are N-alkylamino acid salts, alkylether carboxylic acid salts, acylated peptides, alkylsulfonic acid salts, alkylbenzene and alkylnaphthalene sulfonic acid salts, sulfosuccinic acid salts, α-olefin sulfonic acid salts, N-acylsulfonic acid salts, sulfonated oils, alkylsulfonic acid salts, alkylether sulfonic acid salts, alkylallylethersulfonic acid salts, alkylamidesulfonic acid salts, alkylphosphoric acid salts, alkyletherphosphoric acid salts, alkylallyletherphosphoric acid salts, alkyl and alkylallylpolyoxyethylene ethers, alkylallylformaldehyde condensed acid salts, alkylallylethersulfonic acid salts, alkylamidesulfonic acid salts, alkylphosphoric acid salts, alkyletherphosphoric acid salts, alkylallyletherphosphoric acid salts, alkyl and alkylallylpolyoxyethylene ethers, alkylallylformaldehyde condensed polyoxyethylene ethers, blocked polymers having polyoxypropylene, polyoxyethylene polyoxypropylalkylethers, polyoxyethyleneether of glycolesters, polyoxyethyleneether of sorbitanesters, polyoxyethyleneether of sorbitolesters, polyethyleneglycol aliphatic acid esters, glycerol esters, sorbitane esters, propyleneglycol esters, sugaresters, fluoro $C_2$–$C_{10}$ alkylcarboxylic acids, disodium N-perfluorooctanesulfonyl glutamate, sodium 3-(fluoro-$C_6$–$C_{11}$-alkyloxy)-1-$C_3$–$C_4$ alkyl sulfonates, sodium 3-(ω-fluoro-$C_6$–$C_8$-alkanoyl-N-ethylamino)-1-propane sulfonates, N-[3-(perfluorooctanesulfonamide)-propyl]-N,N-dimethyl-N-carboxymethylene ammonium betaine, fluoro-$C_{11}$–$C_{20}$ alkylcarboxylic acids, perfluoro-$C_7$–$C_{13}$-alkyl-carboxylic acids, perfluorooctane sulfonic acid diethanolamide, Li, K and Na perfluoro-$C_4$–$C_{12}$-alkyl sulfonates, N-propyl-N-(2-hydroxyethyl)perfluorooctane sulfonamide, perfluoro-$C_6$–$C_{10}$-alkylsulfonamide-propyl-sulfonyl-glycinates, bis-(N-perfluorooctylsulfonyl-N-ethanolaminoethyl) phosphonate, mono-perfluoro $C_6$–$C_{16}$ alkyl-ethyl phosphonates, and perfluoroalkylbetaine.

Useful cationic surfactants include N-alkyl dimethyl ammonium chloride, palmityl trimethyl ammonium chloride, dodecyldimethylamine, tetradecyldimethylamine, ethoxylated alkyl guanidine-amine complex, oleamine hydroxypropyl bistrimonium chloride, oleyl imidazoline, stearyl imidazoline, cocamine acetate, palmitamine, dihydroxyethylcocamine, cocotrimonium chloride, alkyl polyglycolether ammonium sulphate, ethoxylated oleamine, lauryl pyridinium chloride, N-oleyl-1,3-diaminopropane, stearamidopropyl dimethylamine lactate, coconut fatty amide, oleyl hydroxyethyl imidazoline, isostearyl ethylimidonium ethosulphate, lauramidopropyl PEG-dimoniumchloride phosphate, palmityl trimethylammonium chloride, and cetyltrimethylammonium bromide.

Especially useful are the fluorocarbon surfactants as described in e.g. U.S. Pat. No. 4,781,985, having a structure of: $F(CF_2)_{4-9}CH_2CH_2SCH_2CH_2N^+R_3X^-$ wherein R is a hydrogen or an alkyl group; and in U.S. Pat. No. 5,084,340, having a structure of: $CF_3(CF_2)_mCH_2CH_2O(CH_2CH_2O)_nR$ wherein m=2 to 10; n=1 to 18; R is hydrogen or an alkyl group of 1 to 10 carbon atoms. These surfactants are commercially available from DuPont and 3M. The concentration of the surfactant component in the ink-receiving layer is typically in the range of 0.1 to 2%, preferably in the range of 0.4 to 1.5% and is most preferably 0.75% by weight based on the total dry weight of the layer.

The ink-receiving layer may be crosslinked to provide such desired features as waterfastness and non-blocking characteristics. The crosslinking is also useful in providing abrasion resistance and resistance to the formation of fingerprints on the element as a result of handling. There are a vast number of known crosslinking agents—also known as hardening agents—that will function to crosslink film forming binders. Hardening agents can be used individually or in combination and in free or in blocked form. A great many hardeners, useful for the present invention, are known, including formaldehyde and free dialdehydes, such as succinaldehyde and glutaraldehyde, blocked dialdehydes, active esters, sulfonate esters, active halogen compounds, isocyanate or blocked isocyanates, polyfunctional isocyanates, melamine derivatives, s-triazines and diazines, epoxides, active olefins having two or more active bonds, carbodiimides, zirconium complexes, e.g. BACOTE 20, ZIRMEL 1000 or zirconium acetate, trademarks of MEL Chemicals, titanium complexes, such as TYZOR grades from DuPont, isoxazolium salts subsituted in the 3-position, esters of 2-alkoxy-N-carboxy-dihydroquinoline, N-carbamoylpyridinium salts, hardeners of mixed function, such as halogen-substituted aldehyde acids (e.g. mucochloric and mucobromic acids), onium substituted acroleins and vinyl sulfones and polymeric hardeners, such as dialdehyde starches and copoly(acroleinmethacrylic acid), and oxazoline functional polymers, e.g. EPOCROS WS-500, and EPOCROS K-1000 series, and maleic anhydride copolymers, e.g. GANTREZ AN119

The ink-receiving layers and the optional supplementary layers of the present invention may also comprise a plasticizer such as ethylene glycol, diethylene glycol, propylene glycol, polyethylene glycol, glycerol monomethylether, glycerol monochlorohydrin, ethylene carbonate, propylene carbonate, tetrachlorophthalic anhydride, tetrabromophthalicanhydride, urea phosphate, triphenylphosphate, glycerolmonostearate, propylene glycol monostearate, tetramethylene sulfone, n-methyl-2-pyrrolidone, n-vinyl-2-pyrrolidone.

The ink-receiving layers and optional extra layers of the present invention may also comprise ingredients to improve the lightfastness of the printed image, such as antioxidants, Uv-absorbers, peroxide scavengers, singlet oxygen quenchers such as hindered amine light stabilizers, (HALS compounds) etc. Stilbene compounds are a preferred type of UV-absorber.

The UV-curable Lacquer Composition

The essential ingredients of the UV-curable photopolymerizable composition to be applied on top of the ink receiving layer are a monomer and a photoinitiator.

A wide variety of photopolymerizable and photocrosslinkable compounds can be used in the present invention. Suitable monomers include the monomers disclosed in DE-OS Nos. 4005231, 3516256, 3516257, 3632657 and U.S. Pat. No. 4,629,676, unsaturated esters of polyols, particularly such esters of the α-methylene carboxylic acids, e.g. ethylene diacrylate, glycerol tri(meth)acrylate, diethylene glycol di(meth)acrylate, 1,3-propanediol di(meth) acrylate, 1,2,4-butanetriol tri(meth)acrylate, 1,4-cyclohexanediol di(meth)acrylate, 1,4-benzenediol di(meth) acrylate, pentaerythritol tetra(meth)acrylate, pentaerythritol triacrylate, dipentaerythritol pentacrylate, trimethylolpropane triacrylate, 1,5-pentadiol di(meth)acrylate, the bis-acrylates and bis-methacrylates of polyethylene glycols of molecular weight 200–500; unsaturated amides, particularly those of the a-methylene carboxylic acids, and especially those of α,ω-diamines and oxygen-interrupted ω-diamines, such as bis-acrylamide, methylene bis-methacrylamide, 1,6-hexamethylene bis-acrylamide, diethylene triamine trismethacrylamide, bis(γ-methacrylamidopropoxy) ethane, β-methacrylamidoethyl methacrylate, N-(β-hydroxyethyl)-β-(methacrylamido)ethyl acrylate, and N,N-bis(β-methacryloyloxyethyl)acrylamide; vinyl esters, e.g. divinyl succinate, divinyl adipate, divinyl phthalate, divinyl butane-1,4-disulphonate; and unsaturated aldehydes, e.g. sorbaldehyde (hexadienal).

The photopolymerizable composition may also comprise polymers and/or oligomers comprising two or more different polymerizable functions, e.g. acrylated epoxies, polyester acrylates, urethane acrylates, etc.

It is also possible to use monofunctional (meth)acrylic acid esters as monomer provided they are not to volatile and do not spread an unwanted odour. Suitable compounds include n-octylacrylate, decylacrylate, decylmethacrylate, stearylacrylate, stearylmethacrylate, cyclohexylacrylate, cyclohexylmethacrylate, phenylethylacrylate, phenylethylmethacrylate.

The most preferred compounds comprise one or more (meth)acrylate functional groups.

Other classes of photopolymerizable compounds containing one or more (meth)acrylate groups are reactive multifunctional monomers as disclosed in EP 502562.

Suitable photoinitiators are a wide variety of compounds or compound combinations which are known for this purpose. Examples are benzoin ethers, benzil ketals, polycyclic quinones, benzophenone derivatives, triarylimidazolyl dimers, photosensitive trihalomethyl compounds, for example trichloromethyl-s-triazines. Preference is given to 2,3-bisarylquinoxalines, as described in U.S. Pat. No. 3,765, 898, and 2-aryl-4,6-bistrichloromethyl-s-triazines. The amount of photoinitiator or photoinitiator combination is generally between 1 and 25% by weight, preferably between 5 and 15% by weight.

The UV curable composition may also contain a minor amount of a heat polymerization inhibitor which prevents premature polymerization before the UV curing step. Examples of such inhibitors include p-methoxyphenol, hydroquinone, aryl- or alkyl substituted hydroquinone, t-butylcatechol, pyrogallol, copper(I) chloride, phenothiazine, chloranil, naphtylamine, α-naphtol, 2,6-ditbutyl-p-cresol, etc. A preferred polymerization inhibitor is 2-methyl hydroquinone. The heat polymerization inhibitors are preferable used in an amount of 0.001 to 5 parts by weight per 100 parts of monomer.

Optionally the composition may also contain a minor amount of organic solvent, e.g. ethyl acetate.

Following commercially available compounds (chemical and commercial names) can be used with good result in the UV curable composition in connection with the present invention (without meaning to be exhaustive).

Photopolymerizable Monomers/Oligomers:

(Chemical Name; Type, Vendor)

pentaerythritol triacrylate; SR-444 (Sartomer)

trimethylolpropane triacrylate; SR-351 (Sartomer)

dipropyleneglycol diacrylate; SR-508 (Sartomer)

amine modified polyether acrylate oligomer; CN-501 (Sartomer)

isobornyl acrylate; SR-506 (Sartomer)

diethyleneglycol divinylether; RAPI-CURE DVE-2 (ISP)

triethyleneglycol divinylether; RAPI-CURE DVE-3 (ISP)

urethane acrylate blended with 2(2-ethoxyethoxy) ethylacrylate (SR-256); CN-966H90 (Sartomer)

polybutadiene dimethyl acrylate; CN-301 (Sartomer)

low viscosity oligomer; CN-135 (Sartomer)

low viscosity oligomer; CN-137 (Sartomer)

Photoinitiators:

IRGACURE 907 (from Ciba-Geigy Co.)

NOVOPOL PI3000 (from Rahn Co.)

GENOCURE DEAP (from Rahn Co.)

IRGACURE 184 (from Ciba-Geigy Co.)

EZACURE KK (from Fratelli Lamberti Co.)

IRGACURE 500 (from Ciba-Geigy Co.)

IRGACURE 819 (from Ciba-Geigy Co.)

Having described the principal ingredients we will now discuss in more details the different steps of the process of the present invention.

In a most preferred embodiment the information carrier having a web or sheet form is printed with a first set of information before application of an ink receiving layer. This first set of information information is preferably general information and/or security print This general information may, for instance, include name, abbreviation or logo of the issuing authority. The security print may, for instance, include a concrete recognizable design, or an abstract periodically repeating monochrome or multichrome pattern, or a gradually changing colour pattern, which gradually changes in hue and/or density of the colours, and is in this way difficult to counterfeit. Preferably the spectral characteristics of the inks of the security print are chosen so that they are difficult to copy by means of a commercial colour copier.

This general information or security print can be applied by any known printing technique, e.g. letterpress, lithographic printing, gravure printing, silk screen printing, etc. A preferred technique is driographic printing being a waterless variant of lithographic printing whereby no fountain solution is applied to the printing press.

When the information carrier is meant to be cut lateron in multiple identity cards the printed general information and/ or security print pattern in repeatedly applied over multiple areas of the web or sheet by a step and repeat process thus giving rise to multiple identical items.

Then on top of the information carrier an ink receiving layer is coated the composition of which is extensively explained above. This ink receiving layer may be coated onto the support by any conventional coating technique, such as dip coating, knife coating, extrusion coating, spin coating, slide hopper coating and curtain coating.

In an alternative embodiment the first set of information is also printed on top of this ink receiving layer and not on the rigid support.

It is essential to the present invention that this ink receiving layer is printed with a digitally stored second set of information, different from the first set, by means of an ink jet printer. In a most preferred embodiment this other type of information is personalized information different for each individual item present on the information carrier. For instance, this personalized information may be a unique individual card number assigned to the future bearer of the card, or the expiry date of the validity of the card, or personal data of the future bearer, e.g. a birth day, and/or a photo.

The ink jet printing process may be performed by any known technique known in the art. In a first type of process a continuous droplet stream is created by applying a pressure wave pattern. This process is known as continuous ink jet printing. In a first embodiment the droplet stream is divided into droplets that are electrostatically charged, deflected and recollected, and into droplets that remain uncharged, continue their way undeflected, and form the image. Alternatively, the charged deflected stream forms the image and the uncharged undeflected jet is recollected. In this variant of continuous ink jet printing several jets are deflected to a different degree and thus record the image (multideflection system).

According to a second process the ink droplets can be created "on demand" ("DOD" or "drop on demand" method) whereby the printing device ejects the droplets only when they are used in imaging on a receiver thereby avoiding the complexity of drop charging, deflection hardware, and ink recollection. In drop-on-demand the ink droplet can be formed by means of a pressure wave created by a mechanical motion of a piezoelectric transducer (so-called "piezo method"), or by means of discrete thermal pushes (so-called "bubble jet" method, or "thermal jet" method).

Ink compositions for ink jet typically include following ingredients: dyes or pigments, water and/or organic solvents, humectants such as glycols, detergents, thickeners, polymeric binders, preservatives, etc. It will be readily understood that the optimal composition of such an ink is dependent on the ink jetting method used and on the nature of the substrate to be printed. The ink compositions can be roughly divided in:

water based; the drying mechanism involves absorption, penetration and evaporation;

oil based; the drying involves absorption and penetration;

solvent based; the drying mechanism involves primarely evaporation;

hot melt or phase change: the ink vehicle is liquid at the ejection temperature but solid at room temperature; drying is replaced by solidification;

UV-curable; drying is replaced by polymerization.

The colorants present in the ink jet ink may be dyes which are molecularly dissolved in the ink fluid, e.g. acid dyes which are bound by a cationic mordant in the ink receiver, or they may be pigments which are finely dispersed in the ink fluid.

In a following step the obtained assemblage carrying both sets of information is coated, sprayed or jetted with an UV curable lacquer, the composition of which is discussed in detail above. As a result of the impregnation of the lacquer composition into the ink receiver the latter gradually becomes substantially transparent. As explained earlier the better the match of the refraction indices of the lacquer composition and the pigment in the receiver the better the transparency.

The penetration time of the lacquer in the layer can be shortened by following measures: lowering of the viscosity of the lacquer by means of a temperature rise or by means of the addition of a diluent monomer such as isobornyl acrylate, or by minimizing the ratio of polymeric binder amount to pigment amount in the ink receiving layer. Furtheron, the higher the porosity of the receiving layer the shorter the penetration time.

The applied lacquer layer may fully cover the information carrier so that all individual items become transparent over their total area and the first set of information is fully revealed. It is possible to impregnate each item on the information carrier only partially or even pattern-wise so that the first set of information is only partially or pattern-wise revealed. In the latter case the applied pattern becoming transparent can represent itself some type of general information or serve as a particular kind of watermark. In this case the first set of information may optionally be omitted.

Then, in a preferred embodiment, the thus obtained assemblage is laminated before curing with a protective transparent foil which optionally can be printed with a third set of information. A preferred protective foil is a thin polyethylene terephthalate foil.

Finally, the finished assemblage is cured by means of UV radiation. Apparatuses for radiation curing are known to those skilled in the art and are commercially available. For example, the curing proceeds with medium pressure mercury vapour lamps with or without electrodes, or pulsed xenon lamps. These ultraviolet sources usually are equipped with a cooling installation, an installation to remove the produced ozone and optionally a nitrogen inflow to exclude air from the surface of the product to be cured during radiation processing. An intensity of 40 to 240 W/cm in the 200–400 nm region is usually employed. An example of a commercially available ultraviolet medium-pressure electrodeless mercury vapour lamp is the model VPS/I600 curing system of Fusion UV systems Ltd., UK. A pulsed xenon flash lamp is commercially available from IST Strahlentechnik GmbH, Nürtingen, Germany. Using the Fusion model one has also the possibility to use metal halide doped Hg vapour or XeCl excimer lamps, each with its specific UV emission spectrum. This permits a higher degree of freedom in formulating the curing composition: a more efficient curing is possible using the lamp with the most appropriate spectral characteristics.

As a result of the curing the cohesive force of the receiver layer and the adhesive force between the receiver and the support are strongly improved rendering in this way the information carrier tamper proof since it has become strongly resistent to mechanical and chemical influences.

In a preferred embodiment the finished information carrier is cut into its multiple individual items by known cutting means, each item having the proper dimensions of an ID card. Most types of ID cards have now the standardized dimensions of 85.6 mm×54.0 mm×0.76 mm. This final thickness can be reached by thermal lamination of one or more polymeric foils, e.g. PVC foils.

Depending on the nature of the information in the different information sets the finished ID card can serve as an identity card, a security card, a driver's licence card, a social security card, a bank card, a membership card, a time registration card, a pay card and a credit card, etc.

Apart from the features described above the finished ID card may comprise additional security elements or information carriers such as a hologram, a magnetice strip, or a chip ("smart cards").

The present invention will now be illustrated by the following examples without however being limited thereto.

EXAMPLES

Example 1

A dispersion A was prepared by mixing following ingredients:

18.7 g of silica SIPERNAT 570 (Degussa Co.)

2.7 g of silanol modified polyvinyl alcohol POVAL R-3109 (Kuraray Co.)

1.7 g Of CAT-FLOC T2 (Calgon Europe N.V.)

0.03% of a biocide 0.03% of citric acid.

55.14 g of water

This dispersion was used to prepare following ink receiver composition:

9.4 g of water 9.9 g of a copoly(ethylene-vinylacetate) latex, VINNAPAS EP1 (Air Products & Chem.), 50% dispersion in water 0.4 g of poly(diallyldimethylammonium chloride) CAT FLOC-T2 (Calgon Europe N.V.)

78.3 g of dispersion A 2 g of surfactant cetyltrimethylammonium bromide.

The support was a white opaque polyvinyl chloride (PVC) support, having a thickness of 165 μm, which was printed by means of driographic printing with security print consisting of a gradually changing colour pattern. The ink receiver composition was coated onto this support at a coverage of 120 $g/m^2$ and dried on air. Then the receiver layer was printed by means of an EPSON STYLUS COLOR 900 ink jet printer with multiple sets of digitally stored personalized information.

The obtained image containing assemblage was then overcoated with a UV curable transparent lacquer having following composition 34.4% of amino modified polyether acrylate oligomer CRAYNOR 501 (=CN501) (from Sartomer Co.)

51.6% dipropyleneglycol diacrylate (DPGDA)

2% of ethyl acetate

2% of a 10% solution of methyl hydroquinone in CN501/DPGDA 40/60

10% of photoinitiator IRGACURE 907 (Ciba-Geigy Co.).

The layer was applied with a Braive barcoater of 70 μm. About two minutes after the application of the solution curing was performed by means of a DRSE-120 conveyor with VPS/1600 UV lamp (240 W/cm, speed 33.5 cm/s). To obtain a complete curing two passes were necessary. After complete penetration of the UV lacquer the ink receiver layer became totally transparent so that the underlying driographic security print became clearly visible.

Example 2

A matt transparent PVC support was coated with the same ink receiver composition as in example 1. After drying the receiver layer was printed driographically by means of Presstek Pearl Dry printing plate on a AB Dick 9860 press with a security print pattern consisting of Holstmann/Steinberg Reflecta Magenta Dry ink. Upon this security print ink jet printing of multiple personalized information was performed by means of an EPSON STYLUS COLOR 900 ink jet printer.

The obtained image containing assemblage was then overcoated with the same UV curable lacquer as in example 1. The opaque ink receiver layer became totally transparent. The driographically printed image was substractively visible through the ink jet image.

Examples 3 and 4

Examples 1 and 2 were repeated with following additional steps. Before UV curing a protective foil, being a 23 μm thick PET foil, was laminated on top of the image carrying assemblage. After curing the finished information carrier was cut in multiple ID card each having the dimensions 85.6 mm×54.0 mm×0.76 mm.

The final ID cards had a high mechanical and chemical resistance and were tamper proof.

Example 5

The ink receiver composition of example 1 was coated on a white opaque polyvinyl chloride support, having a thickness of 165 μm, which was printed before by means of driographic printing with gradually changing colour patterns, serving as security print. The wet coating thickness of this ink receiver layer was 60 μm. After drying the ink receiver layer was printed by means of EPSON STYLUS COLOR 900 ink jet printer with a set of digitally stored personal information, like photo, name, adress, birthday, birth place, identification number, etc.

The obtained image containing assemblage was then pattern-wise (e.g. representing the word BELGIUM) overprinted two times in register with the UV curable lacquer composition which was used in example 1 by means of screen printing technique. A NBC monofilament polyester screen of 120 mesh/cm was used. The UV lacquer was able to penetrate in the opaque receiver layer and made it transparent in about one minute after application. Then a transparent protective PET foil (thickness 100 μm) was laminated on top of the UV-lacquer layer. Finally, the assemblage was subjected to UV light by means of a DRSE-120 conveyer provided with a VPS/1600 UV lamp (240 W/cm–speed 20 cm/s). The underlying driographic security print was only clearly revealed in those areas where the lacquer was locally applied thus clearly representing the applied pattern (e.g. the word BELGIUM).

Example 6

This example was similar to the previous one, with the exception that no security print was present on the PVC support, and the lacquer composition was applied pattern-wise in the form of a design. In the finished image the transparent design represented a kind of watermark.

What is claimed is:

1. A method for producing a tamper proof carrier of information, said method comprising the following steps, in order, (1) providing a two-layer assemblage comprising (i) a rigid sheet or web support, and (ii) a porous opaque ink receiving layer comprising a pigment and a binder whereby either the surface of said support, or the surface of said opaque layer carries a first set of printed information, (2) printing a second set of information, different from said first set, onto said porous opaque ink receiving layer by means of ink jet printing, (3) covering totally, partially, or pattern-wise the thus obtained assemblage with a UV-curable laquer composition, by means of coating, printing, spraying or jetting, whereby on penetration of the lacquer in said porous opaque ink receiving layer this layer becomes substantially transparent, (4) curing said lacquer composition by means of an overall UV exposure, thereby improving the adhesion between said support and said ink receiving layer, and the cohesive strength of said ink receiving layer.

2. A method according to claim 1 comprising the additional step (3bis), performed between steps (3) and (4), of laminating a protective transparent foil, which optionally carries a third set of printed information, on top of the assemblage obtained after step (3).

3. A method according to claim 1 comprising the additional step (5) of cutting the finished assemblage in a set of multiple identification cards.

4. A method according to claim 3 wherein said identification card belongs, depending on the type of the different printed information sets, to the group consisting of an identity card, a security card, a driver's licence card, a social security card, a membership card, a time registration card, a bank card, a pay card and a credit card.

5. A method according to claim 4 wherein said first set of printed information is applied by driographic printing.

6. A method according to claim 1 wherein said second set of information, applied by ink jet printing, is personalized information.

7. A method according to claim 6 wherein said personalized information is a photo and/or personal data.

8. A method according to claim 1 wherein said rigid web or sheet support is made of polyvinyl chloride or polyethylene terephthalate.

9. A method according to claim 1 wherein said pigment comprised in said opaque porous ink receiving layer is an inorganic pigment.

10. A method according to claim 9 wherein said inorganic pigment is silica.

11. A method according to claim 1 wherein said UV-curable lacquer composition comprises a photopolymerizable monomer or oligomer, and a photoinitiator.

12. A method according to claim 11 wherein said photopolymerizable monomer or oligomer is an acrylate monomer.

13. A method according to claim 11 wherein said photopolymerizable monomer or oligomer is an amino modified polyether acrylate oligomer.

14. A method according to claim 1 wherein the viscosity of said UV-curable lacquer composition is lower than 500 mPa.s.

15. A method for producing a tamper proof carrier of information, said method comprising the following steps, in order, (1') providing a two-layer assemblage comprising (i) a rigid sheet or web support, and (ii) a porous opaque ink receiving layer comprising a pigment and a binder, (2') printing a first type of information onto said porous opaque ink receiving layer by means of ink jet printing, (3') covering in a predetemined pattern the thus obtained assemblage with a UV-curable lacquer composition, by means of coating, printing spraying or jetting, whereby on penetration of the laquer in said porous opaque ink receiving layer this layer becomes pattern-wise substantially transparent, (4') curing said lacquer composition by means of an overall UV exposure, thereby improving pattern-wise the adhesion between said support and said ink receiving layer, and the cohesive strength of said ink receiving layer.

16. A method according to claim 15 comprising the additional step (3bis'), performed between steps (3') and (4'), of laminating a protective transparent foil, which optionally carries still another set of printed information, on top of the assemblage obtained after step (3).

17. A method according to claim 15 comprising the additional step (5') of cutting the finished assemblage in a set of multiple identification cards.

18. A method according to claim 15 wherein said first type of information is personalized information and said predetermined pattern represents another type of information chosen from general information or a watermark.

* * * * *